(12) United States Patent  
Jones

(10) Patent No.: US 6,654,036 B1  
(45) Date of Patent: Nov. 25, 2003

(54) METHOD, ARTICLE OF MANUFACTURE AND APPARATUS FOR CONTROLLING RELATIVE POSITIONING OF OBJECTS IN A WINDOWS ENVIRONMENT

(75) Inventor: Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 09/587,715

(22) Filed: Jun. 5, 2000

(51) Int. Cl.[7] .................................................. G09G 5/00
(52) U.S. Cl. ........................................ 345/798; 345/788
(58) Field of Search ................................. 345/781–807

(56) References Cited

U.S. PATENT DOCUMENTS 4,819,189 A * 4/1989 Kikuchi et al. ............. 345/797
5,564,002 A * 10/1996 Brown ....................... 345/778
5,841,420 A   11/1998 Kaply et al.
5,920,315 A    7/1999 Santos-Gomez
6,002,397 A   12/1999 Jaaskelainen, Jr.
6,091,395 A *  7/2000 DeStefano .................. 345/862

* cited by examiner

Primary Examiner—Sy D. Luu
(74) Attorney, Agent, or Firm—Moser, Patterson & Sheridan, L.L.P.

(57) ABSTRACT

The preferred embodiment of the present invention generally provides a method, article of manufacture and apparatus for controlling the relative positioning of one or more open windows. Windows are dynamically arranged in response to user activity. Arrangement of the windows is selected to ensure that the user activity remains visible.

41 Claims, 12 Drawing Sheets

METHOD, ARTICLE OF MANUFACTURE AND APPARATUS FOR CONTROLLING RELATIVE POSITIONING OF OBJECTS IN A WINDOWS ENVIRONMENT

BACKGROUND OF THE INVENTION

1. Field of the Invention

The present invention relates to computers and computer software. More specifically, the invention is generally related to controlling the relative positioning of multiple windows displayed on an output device.

2. Background of the Related Art

Users of computer systems often operate within windows environments. A window is a defined area containing text, images and other content and displayable on an output device, such as a cathode ray tube (CRT). Windows provide a convenient means for displaying various content simultaneously on the output device. Using multiple open windows, a user can efficiently view and/or operate on the content contained in each window. For example, a first window may provide an interface for a word processing program while a second window contains instructions for operating the processing program. Thus, the user can view the instructions in the second window while simultaneously carrying out the instructions in the first window.

One problem that frequently occurs in a windows environment, is that the windows will interfere with one another. Consider, for example, a user operating a processing program who desires to access a Help menu. If the processing program currently occupies all of (or sometimes less than all of) the viewable screen area, the Help menu window will be opened on top of the processing program window. Accordingly, a portion of the processing program window will no longer the viewable to the user. In some cases, this is an unacceptable result to the user, such as when the user desires to place text or other contents in the portion of the processing program window currently covered by the Help menu window.

One solution to the foregoing predicament, is to allow the user to toggle between each of the windows. For example, when the user desires to resume typing, the processing program window may be brought to the foreground with a mouse click, a sequence of keystrokes (e.g., a hotkey) or other user-initiated events. However, such a solution is unacceptable because of the resulting inefficiency in requiring the user to continuously toggle between the windows. Additionally, the advantages provided by windows is substantially reduced because the user is required to select an active window and sacrifice all other open windows.

Therefore, there is a need for a method, article of manufacture and system adapted to address the problems associated with a windows environment and the simultaneous use of multiple windows.

SUMMARY OF THE INVENTION

The present invention generally provides an apparatus, program product, and a method for controlling managing multiple open windows. In one aspect of the invention, a method for controlling the position of an active window within a viewable screen area of an output device is provided. The method comprises determining a likelihood that a user activity site in the active window will move into an obstructed position. If the likelihood exists, a screen arrangement is reformatted so that the user activity site is contained in the viewable screen area.

Another aspect of the invention provides a signal bearing medium containing a program which, when executed by one or more processors, performs a method for controlling the position of an active window within a viewable screen area of an output device. The method comprises determining a likelihood that a user activity site in the active window will move into an obstructed position. If the likelihood exists, a screen arrangement is reformatted so that the user activity site is contained in the viewable screen area.

Another aspect of the invention provides, a computer system comprising a display device, a memory and one or more processors configured to execute one or more programs supporting a windows environment comprising an active window within a viewable screen area of an output device. When executed, the programs perform a method comprising determining a likelihood that a user activity site in the active window will move into an obstructed position. If the likelihood exists, a screen arrangement is reformatted so that the user activity site is contained in the viewable screen area.

Still another aspect of the invention provides a method for controlling the position of an active window within a viewable screen area of an output device. The method comprises determining whether a user activity site contained within the active window is in a view-obstructing area of the output device; and, if so, repositioning the active window so that the user activity site is contained within the viewable screen area.

Yet another aspect of the invention provides a signal bearing medium containing a program which, when executed by one or more processors, performs a method for controlling the position of an active window within a viewable screen area of an output device. The method comprises determining whether a user activity site contained within the active window is in a view-obstructing area of the output device; and, if so, repositioning the active window so that the user activity site is contained within the viewable screen area.

Yet another aspect of the invention provides a computer system comprising a display device, a memory and one or more processors configured to execute one or more programs supporting a windows environment comprising an active window within a viewable screen area of the display device. When executed, the programs perform a method, comprising determining whether a user activity site contained within the active window is in a view-obstructing area of the output device; and, if so, repositioning the active window so that the user activity site is contained within the viewable screen area.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The preferred embodiment of the present invention generally provides a method, article of manufacture and apparatus for controlling the relative positioning of multiple open windows. Windows are dynamically arranged in response to user activity when conditions provide a view-obstructing area, object or limit. In some embodiments, the user activity is defined herein by the location of an activity site (e.g., a cursor or mouse pointer). Arrangement of the windows is selected to ensure that the user activity remains visible.

Figure 1:
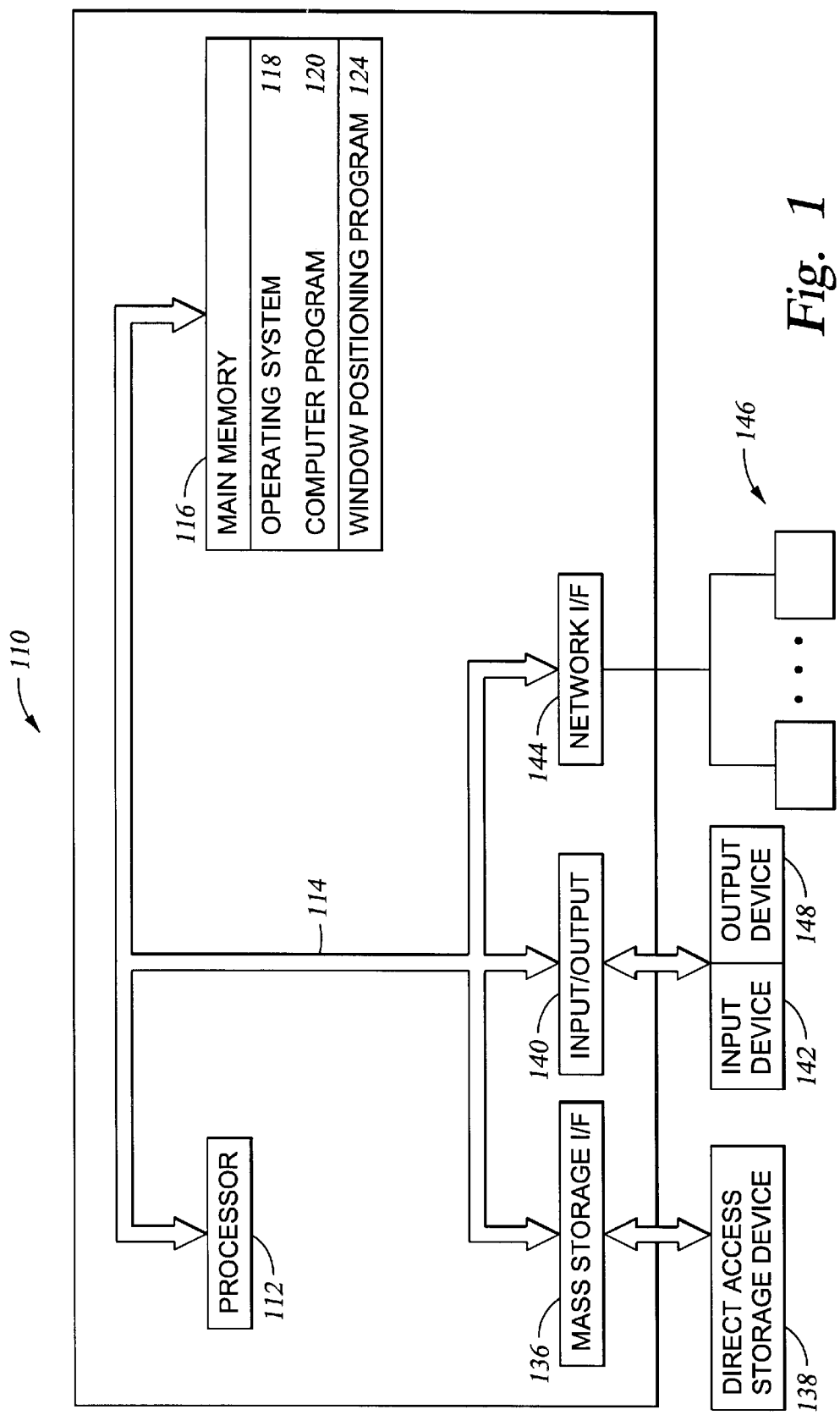
FIG. 1 is a high-level diagram of a computer system consistent with the invention.

Referring now to FIG. 1, a computer system 110 consistent with the invention is shown. For purposes of the invention, computer system 110 may represent any type of computer, computer system or other programmable electronic device, including a client computer, a server computer, a portable computer, an embedded controller, etc. The computer system 110 may be a standalone device or networked into a larger system. In one embodiment, the computer system 110 is an AS/400 available from International Business Machines of Armonk, N.Y.

Computer system 110 is shown for a multi-user programming environment that includes at least one processor 112, which obtains instructions and data via a bus 114 from a main memory 116. The system 112 could be a PC-based server, a minicomputer, a midrange computer, a mainframe computer, etc. adapted to support the methods, apparatus and article of manufacture of the invention.

The main memory 116 includes an operating system 118, a computer program 120, a window positioning program 124. In addition, various data structures (none shown) may be resident in the memory 116. The main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

The computer system 110 can be connected to a number of operators and peripheral systems. Illustratively, the computer system 110 includes a direct access storage device (DASD) 138, input devices 142, output devices 148, and a plurality of networked devices 146. Each of the peripheral systems is operably connected to the computer system via interfaces 136, 140 and 144. The input devices 142 can be any device to give input to the computer system 110. For example, a keyboard, keypad, light pen, touch screen, button, mouse, track ball, or speech recognition unit could be used. The output devices 148 include any conventional display screen and, although shown separately from the input devices 142, the output devices 148 and input devices 142 could be combined. For example, a display screen with an integrated touch screen, and a display with an integrated keyboard, or a speech recognition unit combined with a text speech converter could be used.

In general, the routines executed to implement the embodiments of the invention, whether implemented as part of an operating system or a specific application, component, program, object, module or sequence of instructions will be referred to herein as "the window positioning program 124," or simply "the program 124." The program 124 typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

The window positioning program 124 facilitates dynamically arranging multiple open windows displayed on the output device. The window positioning program 124 may be a separate software component of the computer system 110. Alternatively, the window positioning program 124 may be a sub-component of the operating system 118 or any other software product executing on the computer system 110.

Figure 2:
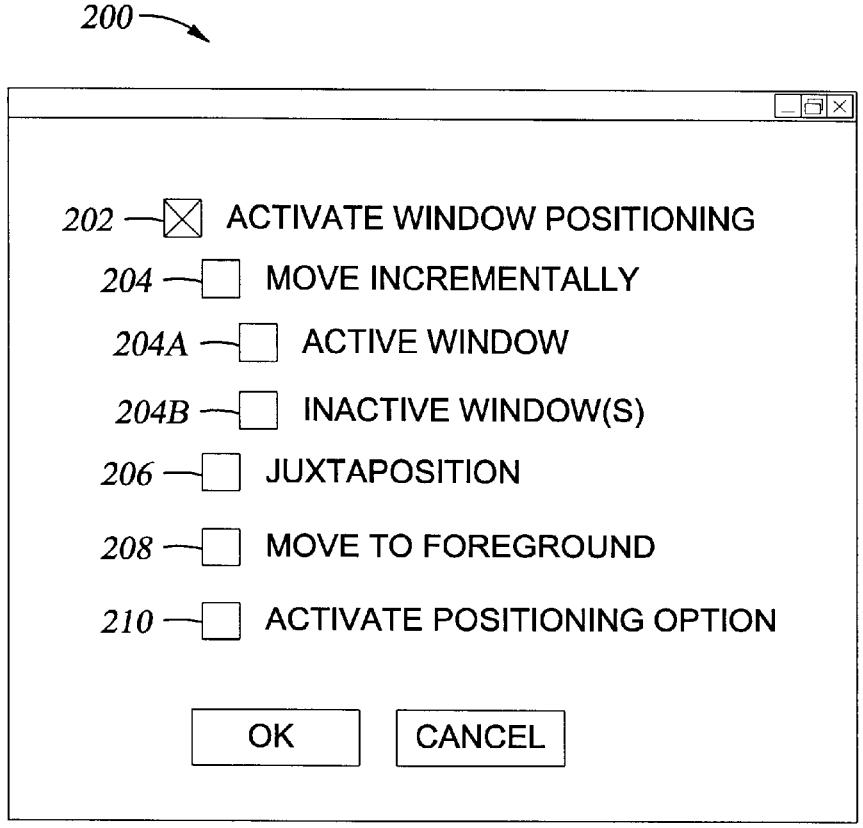
FIG. 2 is an illustrative graphical user interface which can be used to provide user-selectable options.

In one embodiment, the operation of the window positioning program 124 is at least partially defined by user selected parameters. The parameters may be provided to the computer system 110 via graphical user interfaces (GUIs) displayable on the output devices 148. One illustrative GUI 200 is shown in FIG. 2. The GUI 200 is formatted as a window containing multiple checkboxes selectable by the user. An "Activate Window Positioning" checkbox 202 allows the user to select the inventive window positioning feature. If checkbox 202 is selected, the remaining checkboxes then become available for the user's selection. A first three check boxes 204, 206 and 208 determine a particular manner in which windows are moved relative to one another. When checkbox 204 selected, one or more of the windows is moved incrementally in response to a user action (e.g., typing text into an active window). Upon selection of checkbox 204, the user may also determine which of the windows in a display area is moved. Specifically, the user may elect between having the active window move by checking checkbox 204A or having the inactive window(s) move by checking checkbox 204B.

Alternatively, overlapping windows may be juxtaposed in response to the user action when checkbox 206 is selected. In yet another alternative, the user's active window may be moved to the foreground upon detection of a predetermined user event (e.g., inputting text into the active window) when checkbox 208 is selected.

In some embodiments, an "Activate Repositioning Option" is provided (checkbox 210). When checkbox 210 is selected, windows which have been moved as a result of the inventive window positioning feature are returned to their original positions upon detection of a predetermined user event (e.g., pressing the "Enter" button). Illustrative user options made available in the GUI 200 and executed by the window positioning program 124 are illustrated below with reference to FIGS. 3–5 below.

It should be understood that the user selectable options described with reference to GUI 200 are merely illustrative. Other user selectable parameters may be provided and used to advantage in the present invention. For example, in one embodiment, repositioning may include resizing one or more windows so that the user activity and all or selected windows are wholly contained in a screen area. In another embodiment, a user may specify a desired position of an active window and/or inactive window(s) which are moved in response to the dynamic rearrangement of the invention. Illustratively, a user may specify a preference that the active window be moved to an upper left-hand corner of a display area during rearrangement of the windows. The positioning of the inactive windows may be similarly specified relative either to the active window or the display area. The latter embodiment is described below with reference to FIG. 6.

In still other embodiments, the invention responds to situations in which the user activity is located outside of a screen area boundary. Such embodiments are described below with reference to FIGS. 8 and 9. It is understood that additional user selectable parameters may be made available through a GUI (such as GUI 200) to control these and other situations.

Figure 3A:
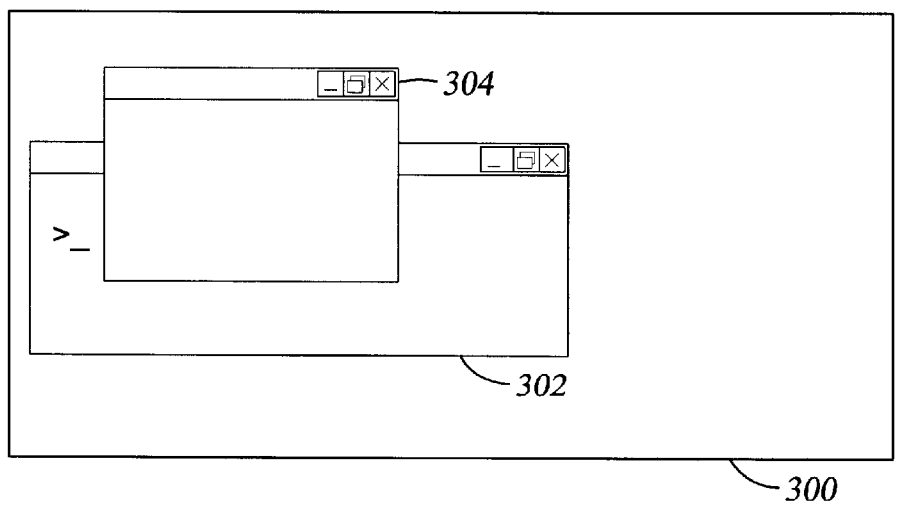
FIGS. 3A–D illustrate the incremental repositioning of an inactive window relative to an active window in response to a determination that user activity would move behind the inactive window.

FIG. 3A shows a display area 300 which may be a viewable screen area of a monitor. The display area 300 contains an active window 302 and an inactive window 304. The inactive window 304 substantially overlaps the active window 302. A cursor is positioned in the visible area of the active window 302 indicating where a user intends to begin typing. If the relative positioning of the active window 302 in the inactive window 304 is left unchanged, the cursor would quickly disappear behind the inactive document 304 as the user types. However, when the window positioning feature of the invention is activated, the positioning of the windows 302, 304 is adjusted to ensure that the current position of the cursor remains visible at all times.

Figure 3B:
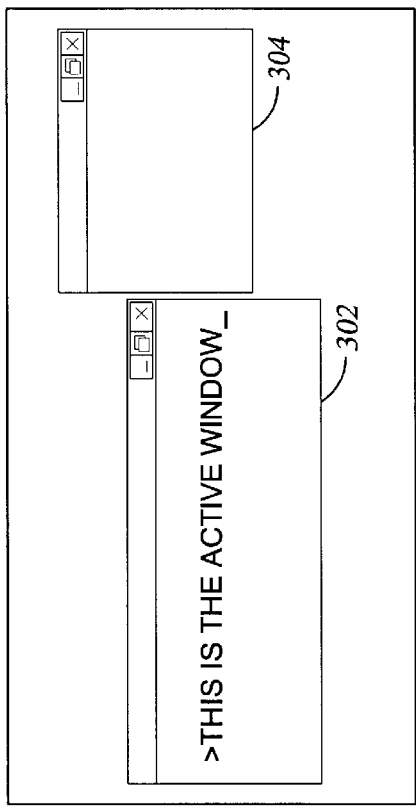
Figure 3C:
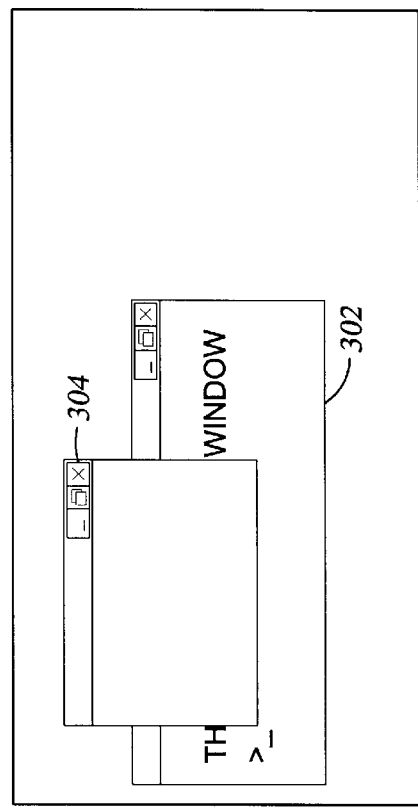
Figure 3D:
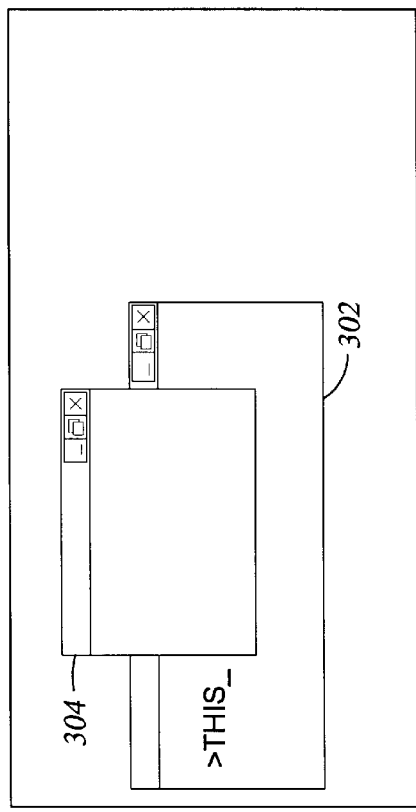

FIGS. 3B–D illustrate one embodiment of the invention in which the inactive window 304 is incrementally moved in response to user activity input to the active window 302. Such incremental repositioning is a result of selecting checkboxes 204 and 204B. A similar result may be achieved by selecting check boxes 204 and 204A in which case the inactive window 304 remains fixed while the active window 302 is moved.

Figure 4A:
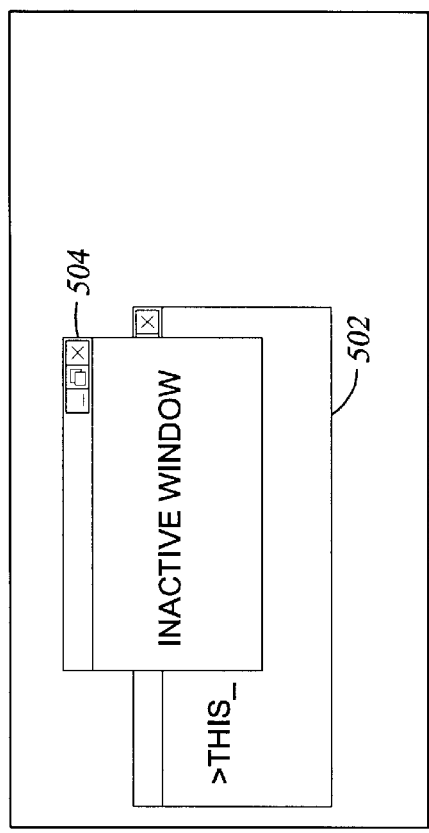
FIGS. 4A–B illustrate the juxtapositioning of an active window and an inactive window in response to a determination that user activity would move behind the inactive window.
Figure 4B:
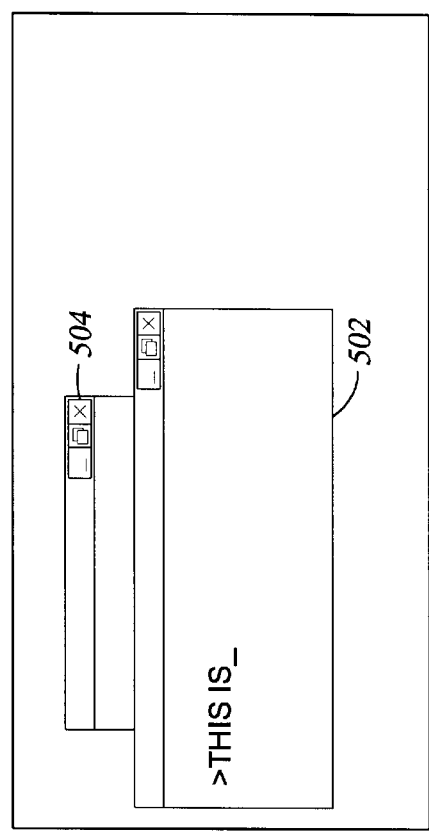

FIGS. 4A and 4B illustrate the result of selecting checkbox 206. FIG. 4A depicts a display area 400 containing an active window 402 and an overlapping inactive window 404. Upon detecting that text being input to the active window 402 will move behind the inactive window 404, the window positioning program 124 repositions the windows 402, 404 as shown in FIG. 4B.

Figure 5A:
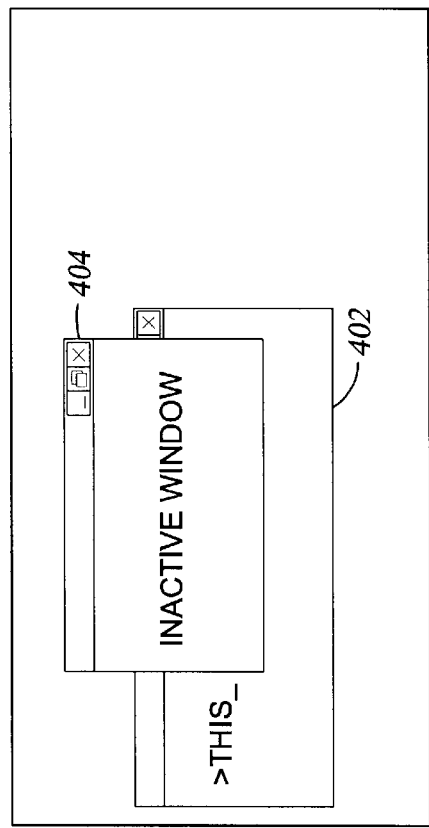
FIGS. 5A–B illustrate the repositioning of an active window to a foreground position relative to an inactive window in response to a determination that user activity would move behind the inactive window.
Figure 5B:
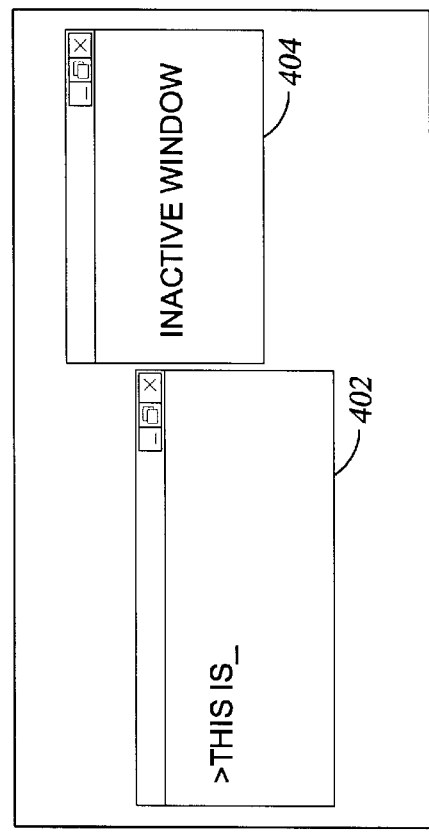

FIGS. 5A and 5B illustrate the result of selecting checkbox 208. In an initial state, an active window 502 is located beneath an inactive window 504. Upon detection that the user activity (determined by the position of the cursor) will move behind the inactive window 504, the active window 502 is moved to the foreground as shown in FIG. 5B.

Figure 3E:
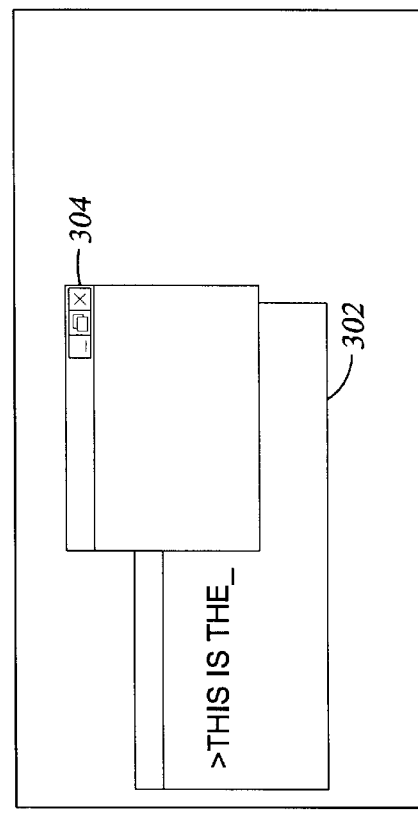
FIG. 3E illustrates the positioning of active and inactive windows after being returned to an original position in response to a predetermined user action.

In the event that the user has selected checkbox 210, the active window and the inactive window are returned to their original positions upon detection of a predetermined user event (also referred to herein as "a repositioning event"). A repositioning event includes any event which places the cursor in a position visible to the user even if all open windows were to be returned to their original positions. In some embodiments, repositioning events include pressing the "Enter" key to cause a hard return, moving the cursor with a mouse click, and the like. Such an embodiment may be illustrated with reference to FIGS. 3A–D, described above, and FIG. 3E. FIG. 3E which depicts the active window 302 and the inactive window 304 after being returned to their original states in response to the predetermined repositioning event. The relative positioning of windows 302, 304 may subsequently again be adjusted in response to the continued input (e.g., typing) provided by the user.

Although FIGS. 3–5 depict only two windows, the invention can be used to advantage with any number of windows. Further, is contemplated that the entire viewable area of the active window and the inactive window(s) need not be visible in the display area of the output device at all times. Thus, portions of either or both windows may be moved outside of the display area so long as the area of interest to the user (e.g., the cursor) is visible.

Figure 6A:
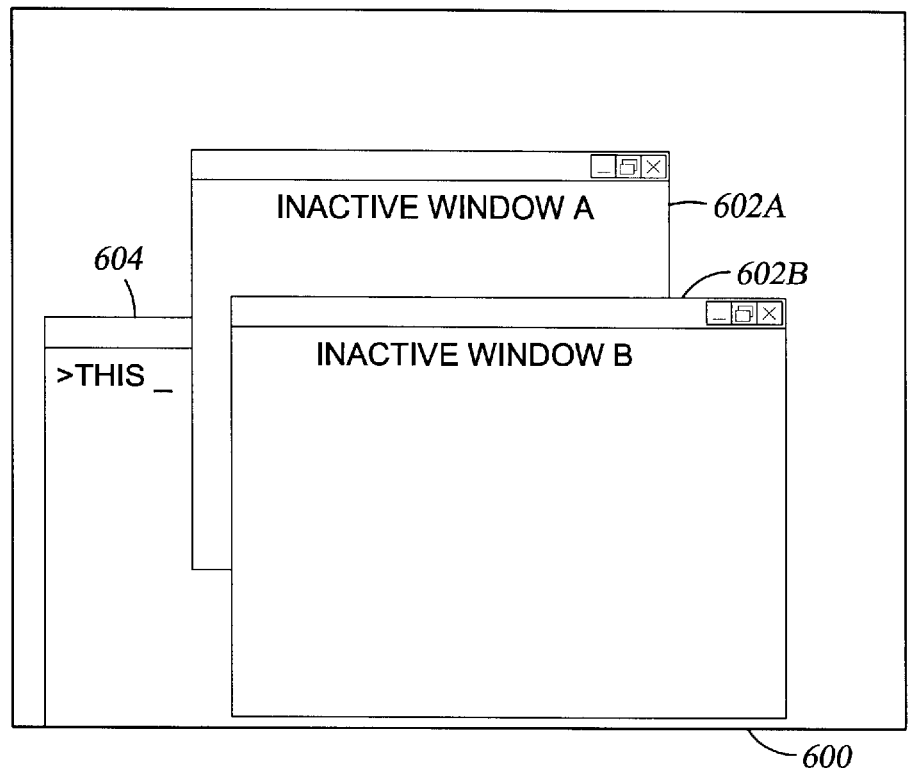
FIGS. 6A–B illustrate the repositioning of an active window and inactive windows according to user-selected preferences upon a determination that user activity would move behind an inactive window.
Figure 6B:
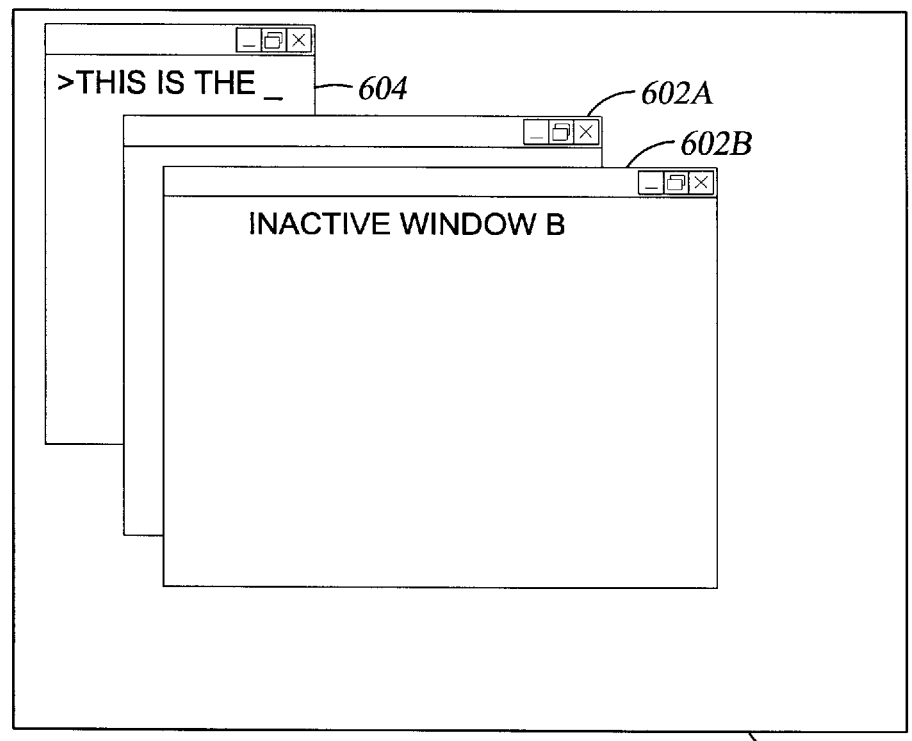
Figure 6C:
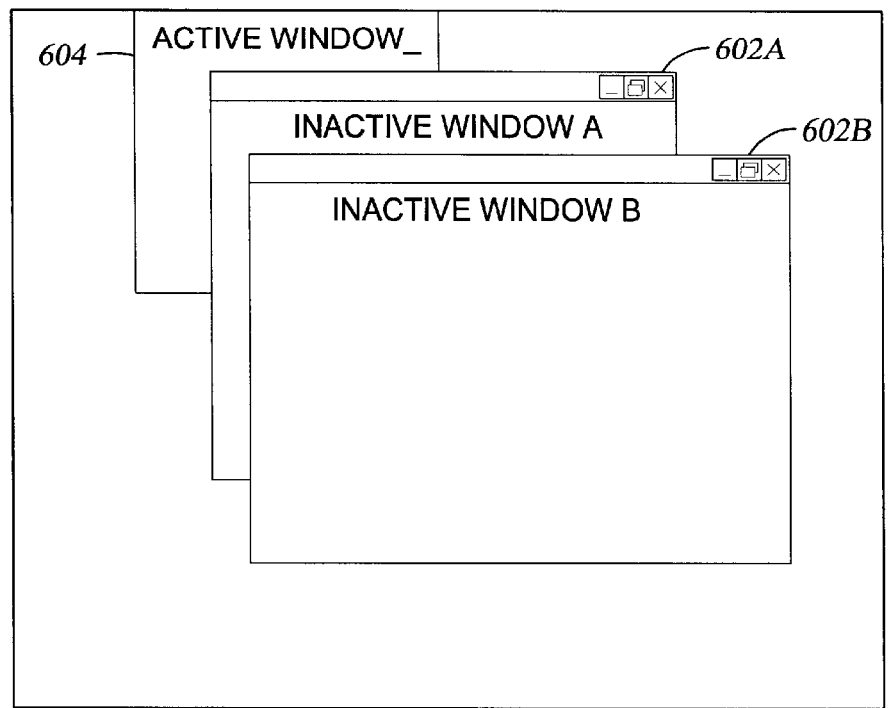
FIG. 6C illustrates the incremental repositioning of the active window of FIGS. 6A–B.

However, in some instances a user may desire that all of a particular window remain visible throughout the dynamic rearrangement steps of the invention. Accordingly, in some embodiments of the invention the user may designate a preferred window. The designation can be made available to the user as an option provided within a GUI, such as GUI 200 described above with reference to FIG. 2. An embodiment wherein the user has designated a preferred window is illustrated in FIGS. 6A–C. FIGS. 6A–C also illustrate an embodiment wherein the user has designated a preferred position of the active window (and more specifically, a preferred position of the user activity within the active window) when being dynamically rearranged.

FIG. 6 depicts a display area 600 containing a pair of inactive windows 602A, 602B and an active window 604. The active window 604 is partially obscured by the inactive window 602A and the user activity (i.e., typing) is one character removed from a left edge of the inactive window 602A. As the user continues typing on the same command line (i.e., from left to right) steps are taken to dynamically rearrange the windows according to the user selected preferences. Illustratively, the user preferences include a designation of the inactive window 602B as the "preferred" window and a designation of the upper left-hand corner of the display area 600 as the preferred position for the user activity within the active window 604. FIG. 6B shows the resulting positions of the windows 602A–B, 604 after being dynamically rearranged. The user activity (as defined by the position of the cursor in the active window 604) is now positioned in the upper left-hand corner of display area 600 and the preferred inactive window 602B is positioned in the display area 600 in full view of the user.

FIG. 6C shows the result of further dynamic rearrangement during the continued typing of the user. In order to satisfy both of the user's preferences, the active window 604 is incrementally moved upwards so that the cursor in the active window 604 remains visible to the user, while the preferred inactive window 602B remains fixed in position.

In addition to being defined by user selected parameters, the dynamic rearrangement steps of the invention may also be controlled according to optimizing algorithms. For example, in some embodiments optimizing algorithms may be provided to determine the relative positions between an active window and inactive windows. The optimizing algorithms can calculate which window to move by determining which window is most visible to the user and then moving the window that is least visible.

Figure 7A:
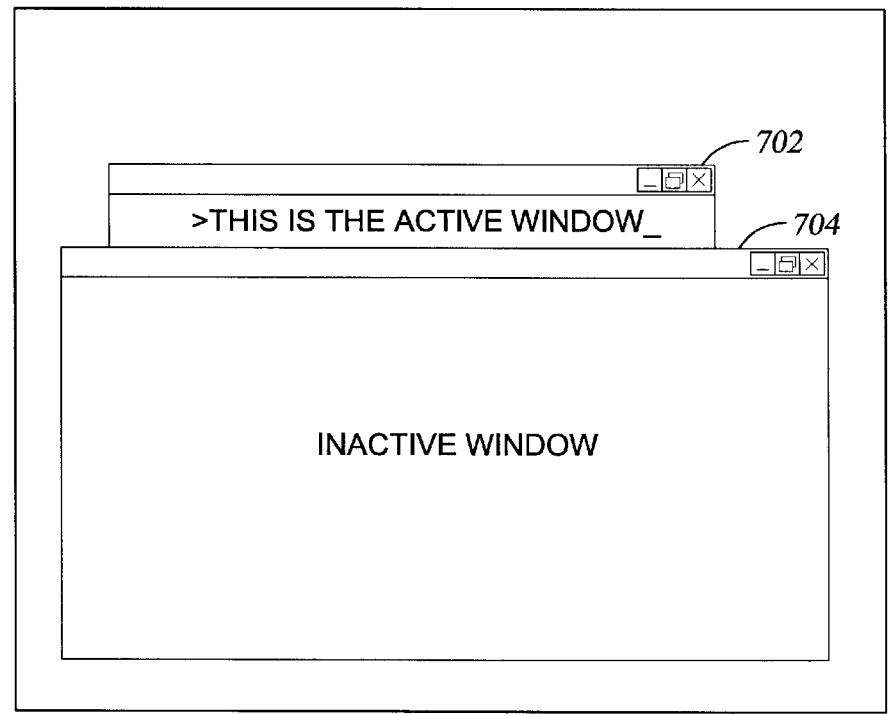
FIGS. 7A–C depicts a display area containing windows which are repositioned according to optimizing algorithms.

One optimizing algorithm may be illustrated with reference to FIGS. 7A–C which show a display area 700 containing an active window 702 partially obscured by an inactive window 704. As shown in FIG. 7A, the cursor is at a terminal end of a command line and upon further typing will be moved downwardly into a position behind the inactive window 704. At this point, a determination is made that the active window 702 is less visible than the inactive window 704. Accordingly, the active window 702 is moved incrementally upwards while the position of the inactive window 704 remains fixed, as shown in FIG. 7B.

Figure 7B:
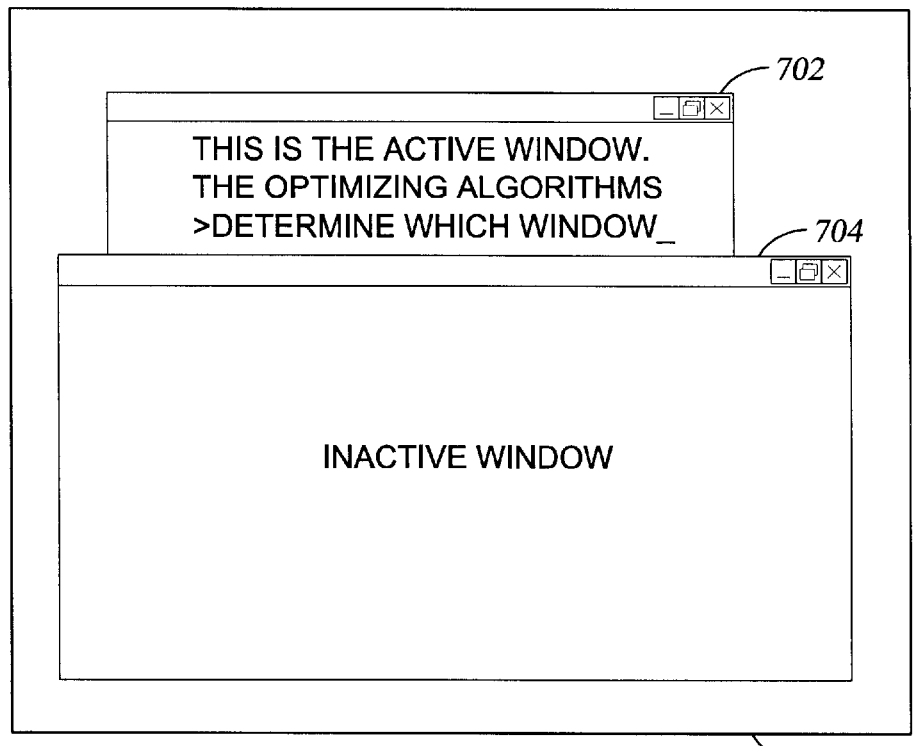
Figure 7C:
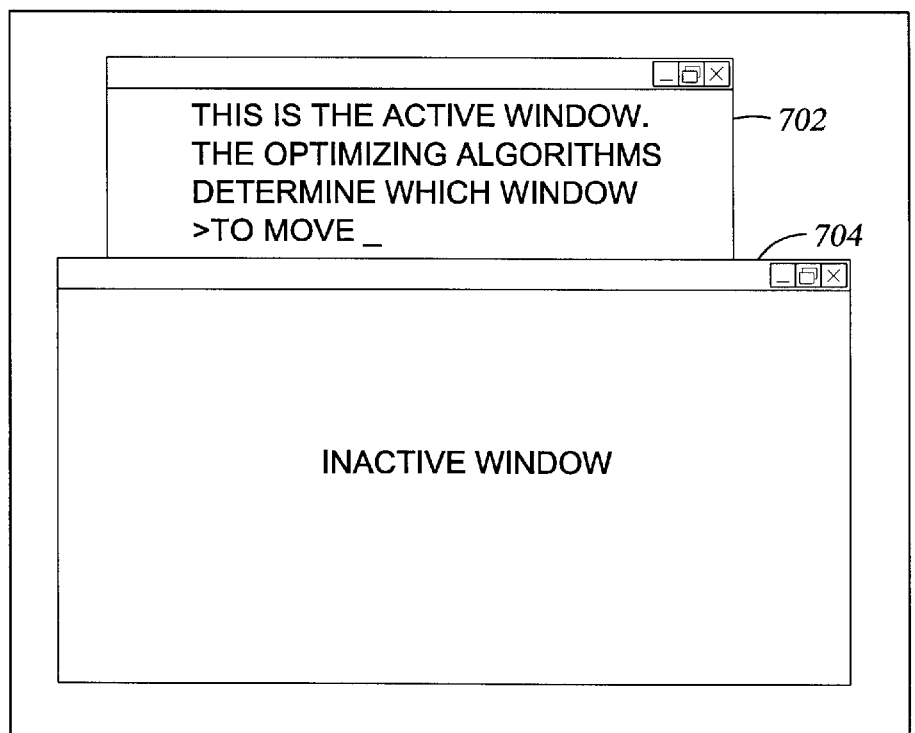

As shown in FIG. 7B, the top of the active window 702 now abuts the upper bound of the display area 700. Thus, if the active window 702 is again moved incrementally upwards a portion of the window 702 will no longer be visible to the user. Accordingly, in another embodiment, optimizing algorithms may be executed to determine alternative window repositioning steps. One such alternative is shown in FIG. 7C in which the inactive window 704 is moved incrementally downward while the active window 704 remains fixed. Other optimizing sequences will be readily recognized by those skilled in the art. In some embodiments, the algorithms are user selectable.

Figure 8A:
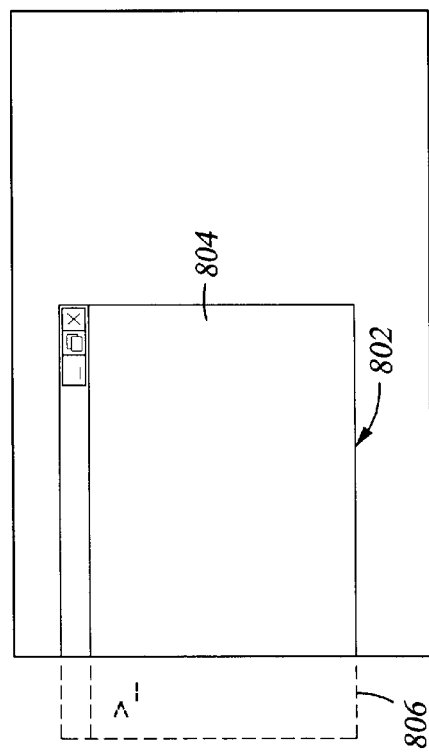
FIG. 8A depicts a display area containing an active window which is partially located in a view-obstructed region outside of the screen area boundary.

The foregoing embodiments illustrate dynamic rearrangement of two or more windows in the event that an inactive window obscures user activity within an active window. In other embodiments, obstruction of a user's view of the user activity within the active window may be the result of screen area boundaries of a display unit. For example, FIG. 8A depicts a display area 800 containing an active window 802. The active window 802 includes a viewable portion 804 and an unviewable portion 806 (represented by dashed lines). The cursor is contained in the unviewable portion 806. Accordingly, user activity is not visible to an operator until the cursor is moved into the viewable portion 804 of the active window 802.

Figure 8B:
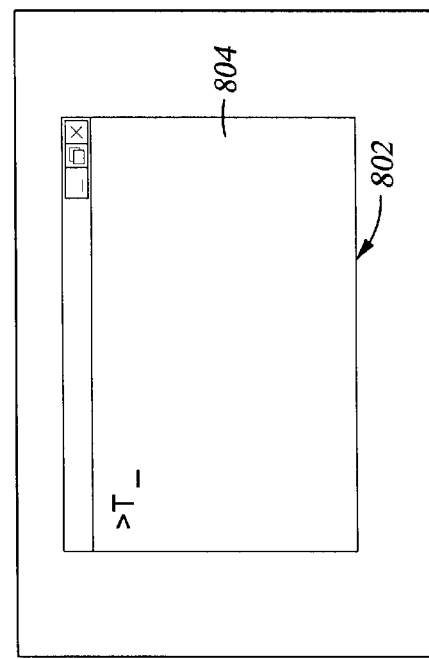
FIG. 8B depicts the display area of FIG. 8A and shows the active window after having been repositioned.

The invention provides for repositioning of the active window 802 upon detection of user activity within the unviewable portion 806. FIG. 8B shows the active window 802 after being dynamically repositioned. The user activity (i.e., the cursor) is now contained within the boundaries of the display area 800.

Figure 9A:
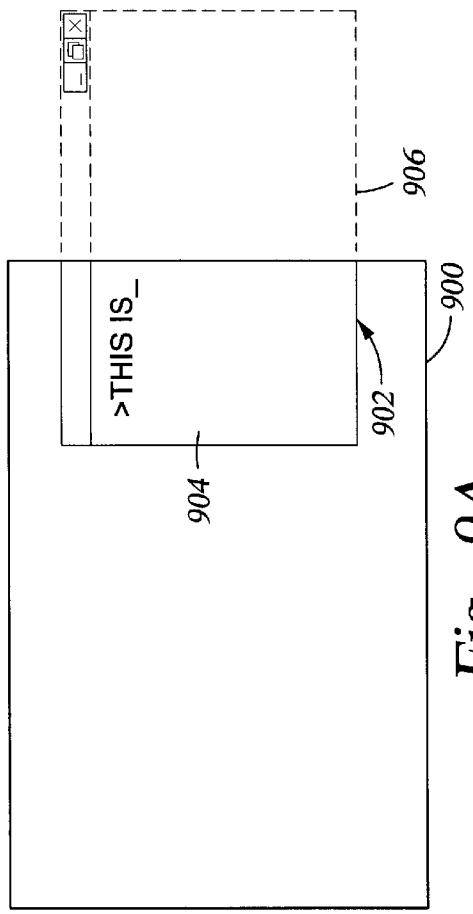
FIG. 9A depicts a display area containing an active window which is partially located in a view-obstructed region outside of the screen area boundary.
Figure 9B:
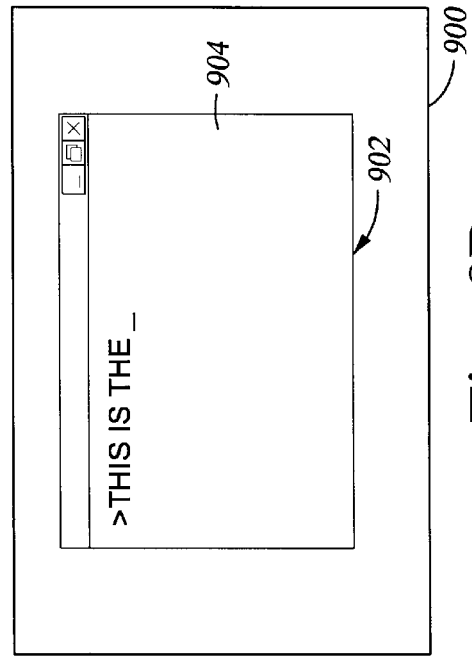
FIG. 9B depicts the display area of FIG. 9A and shows the active window after having been repositioned.

FIGS. 8A–B illustrates a condition in which the cursor is initially outside the boundaries of the display area 800 at commencement of the user activity. FIGS. 9A–B illustrates a condition in which the user activity is initially contained within the boundaries of a display area 900. FIG. 9A depicts an active window 902 having a viewable portion 904 and an unviewable portion 906. The cursor is a single character removed from a right hand boundary of the display area 900. Conventionally, the cursor would move beyond the boundary of the display area 900 upon continued typing by the user. In the present invention, however, the active window 902 is repositioned to be wholly contained within the boundaries of the display area 900.

The repositioning events shown in FIG. 8 and FIG. 9 are merely illustrative. The invention contemplates similar repositioning events in the context of a multiple windows environment. In some embodiments, the repositioning attributes may be defined by user selectable parameters using, for example, a GUI such as the GUI 200 described above with reference to FIG. 2. Further, the "object" obstructing a view of user activity is not limited to a screen boundary. A similar situation arises when an inactive window overlaps the user activity within an active window. The invention contemplates dynamic repositioning in such cases.

Accordingly, the invention provides for repositioning of one or more windows in order to ensure visibility of user activity in a display area. Repositioning may result either in response to detection of a current obstruction (e.g., the user activity is outside the viewable screen area or behind an inactive window) or upon detection of a pending obstruction (e.g., the user activity is at a predetermined threshold of a viewable screen area or an inactive window). The invention is described with reference to obstructions including inactive windows and screen area boundaries. However, the obstruction may be any limit or object, known or unknown in the art, which detrimentally affects a user's ability to view an activity site (e.g., a cursor) within a screen area. Further, in one embodiment, the object need not be opaque. For example, the object may be a partially transparent image or may be a transient image. In any case, a user can choose to control the positioning of the active window with respect to one or more objects.

Figure 10A:
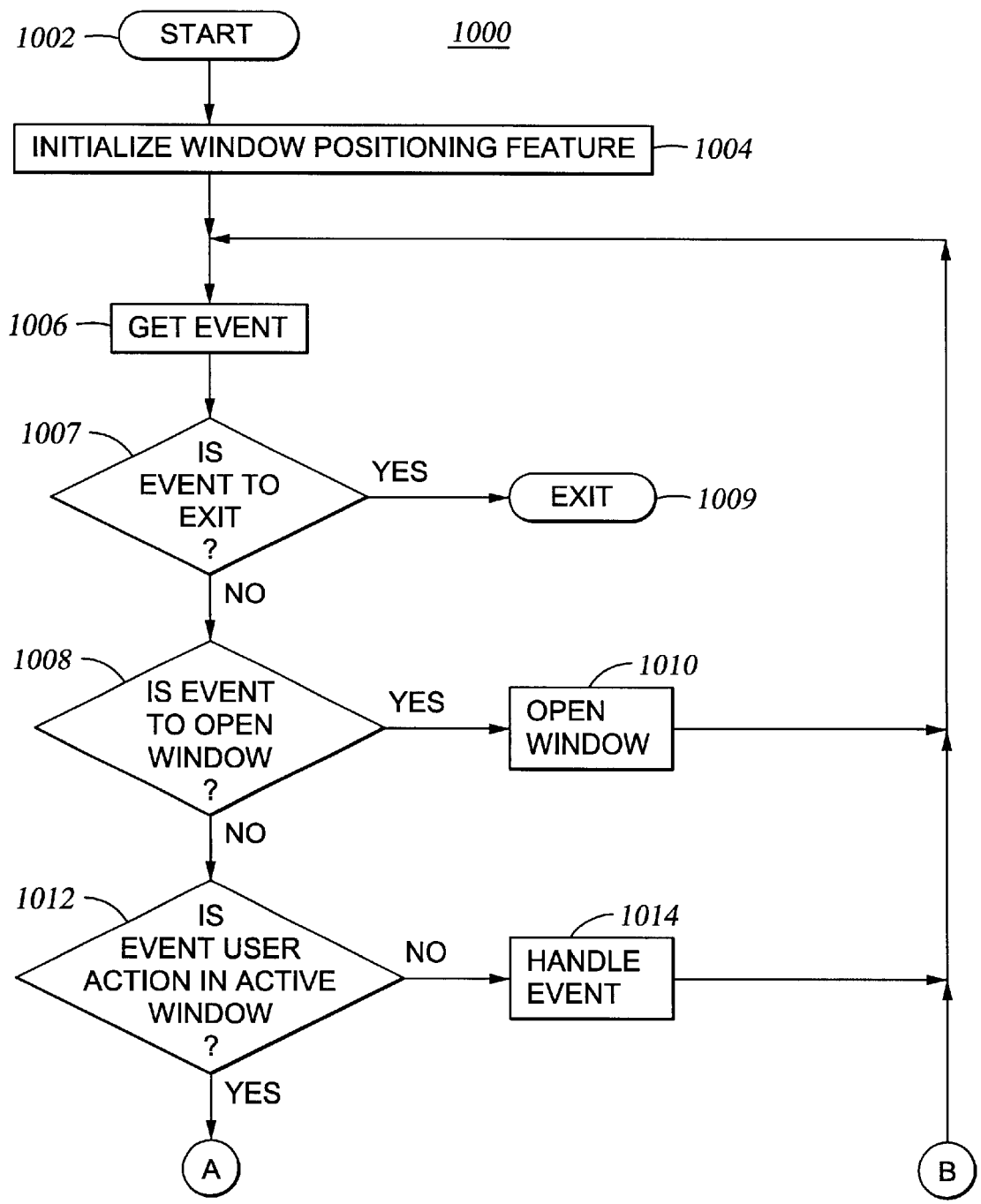
FIG. 10 is a flow diagram of a method for responding to user issued events.
Figure 10B:
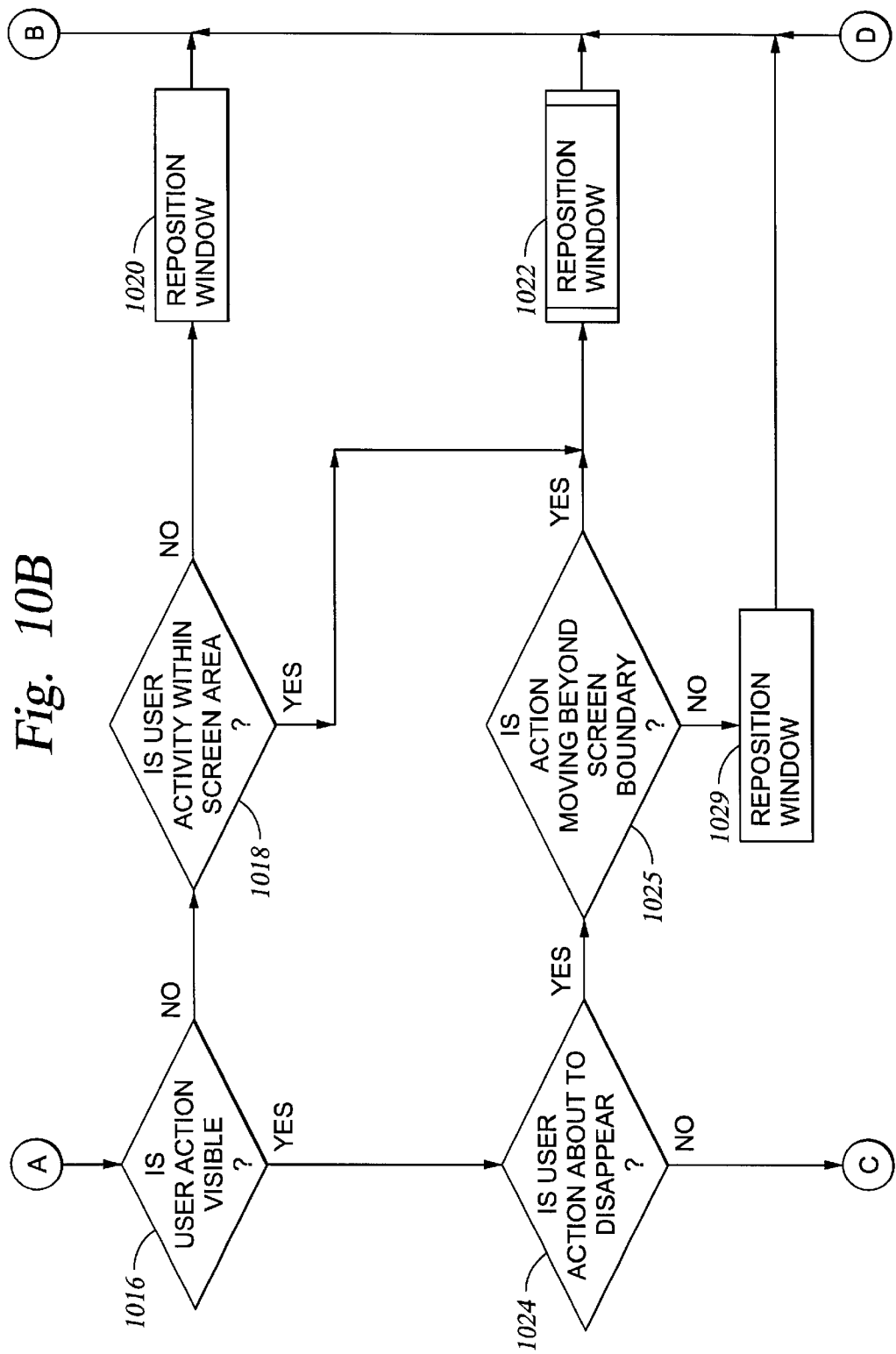
Figure 10C:
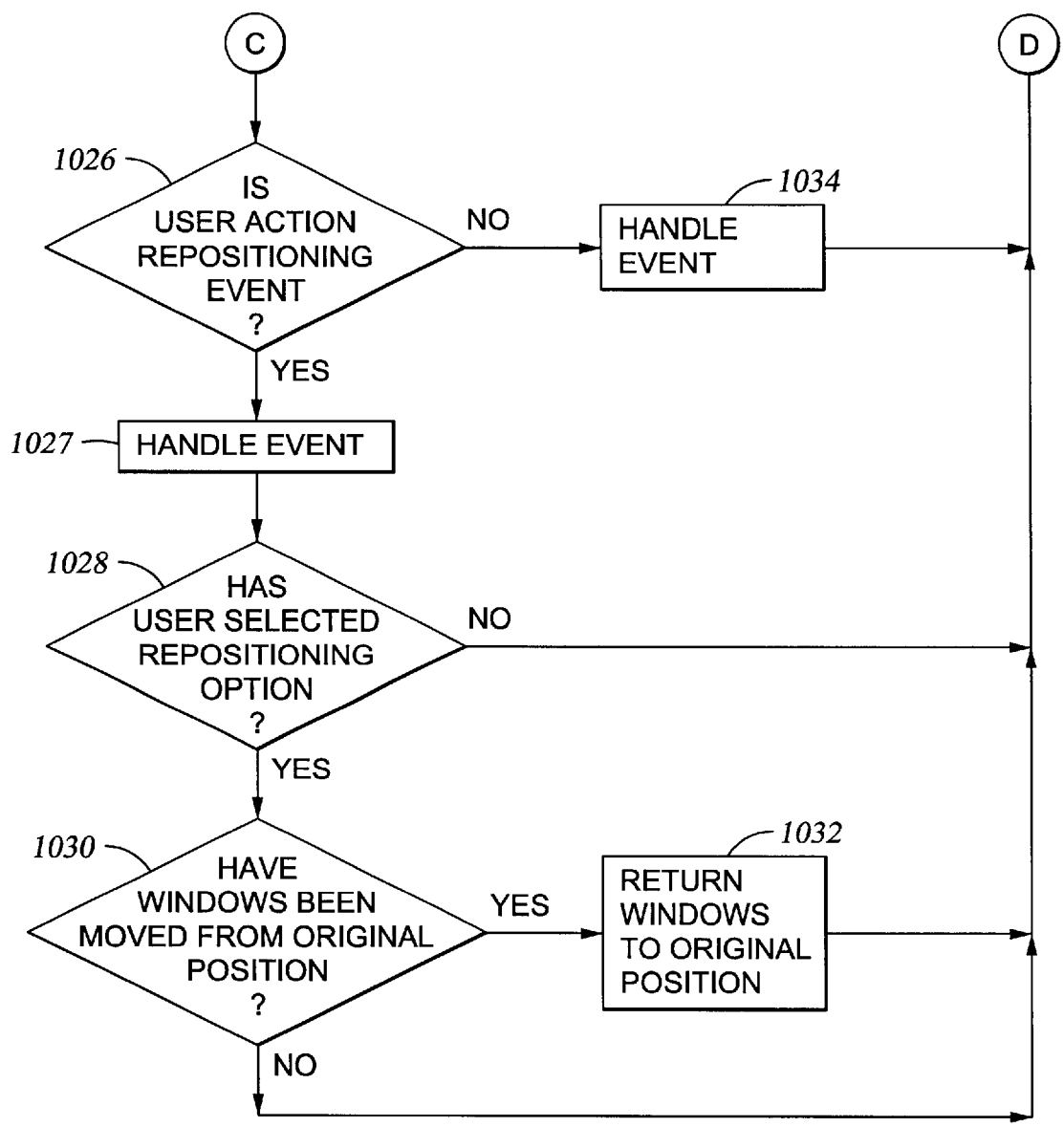

FIG. 10 illustrates one embodiment of a method 1000 performed by the window positioning program 124 when executed by the processor 112. Illustratively, the method 1000 assumes that a user is operating the computer program 120 and that the computer program 120 supports a windows environment.

The method 1000 is entered at step 1002 and proceeds to step 1004 where the window positioning feature is initialized. At step 1006, the method 1000 receives an event. At step 1007, the method 1000 queries whether the event is to exit the method 1000. If so, the method 1000 is exited at step 1009. Otherwise, the method 1000 proceeds to step 1008.

At step 1008, the method 1000 queries whether the event is to open a window. If so, the window is opened at step 1010 and the method 1000 returns to step 1006. Otherwise, the method 1000 proceeds to step 1012 and queries whether the event is a user action in an active window (e.g., typing). If not, the event is handled appropriately at step 1014.

If step 1012 is answered affirmatively, the method 1000 queries whether the user activity is visible (step 1016). The user activity may not be visible either when the cursor of the active window is behind an inactive window (such as when an inactive window is opened on top of an active window) or when the cursor is outside of the display area of the output device. In such an event, the user may be able to continue typing but is unable to see a resulting textual output in the active window.

If step 1016 is answered in the negative, the method 1000 proceeds to step 1018 to query whether the user activity is within the screen area (i.e., contained within the screen boundaries) of the output device. If not, the active window is repositioned (at step 1020) so that the user activity is located within the screen area. Illustrative positioning events for such a condition are described above with reference to FIG. 8 and FIG. 9.

If the user activity is contained within the screen area, the user activity is determined to be behind an inactive window. Accordingly, the method 1000 proceeds to step 1022 where one or more of the open windows are repositioned to allow the user to view the activity within the active window. One embodiment of step 1022 is described with reference to FIG. 11 below.

If step 1016 is answered affirmatively (i.e., the user activity is visible), the method 1000 queries whether the user action is about to disappear (step 1024) as a result of an obstruction. Such conditions were illustrated in FIGS. 3–5 and FIG. 9 in which the user activity is at a threshold of a window or screen boundary. In one embodiment, the determination at step 1024 comprises determining a distance between the user activity and the obstruction. The threshold distance may be measured as a number or alphanumeric characters, for example.

Accordingly, if step 1024 is answered affirmatively, the method 1000 proceeds to determine whether the obstruction is a screen boundary or a window. At step 1025, the method 1000 queries whether the user activity is moving beyond a screen area boundary. If so, the active window is repositioned (at step 1029) to maintain the user activity within the screen area boundaries (as was described above with reference to FIG. 9).

If step 1025 is answered negatively, then it is known that the obstruction is an inactive window and that the user activity is on the threshold of moving behind the window. Accordingly, one or more of the open windows are repositioned at step 1022. The method 1000 may similarly determine obstructions other than a screen boundary and inactive window.

If step 1024 is answered in the negative, the method 1000 proceeds to step 1026 and queries whether the user action is a repositioning event (illustrative repositioning events were described above). If the user action is not a repositioning event, the conventional action is handled at step 1034. Otherwise, the method 1000 proceeds to step 1027 where the repositioning event is handled (e.g., a hard return is processed in response to the user striking the "Enter" key).

Method 1000 then proceeds to step 1028 to query whether the user has selected the repositioning option (activating checkbox 210). As described above, one embodiment of the invention includes a repositioning option selectable by activating checkbox 210 of the GUI 210. When selected, the repositioning option causes windows which have been dynamically repositioned at step 1022 to be returned to their initial positions upon detection of a repositioning event.

If the user has not selected the repositioning option, the windows are left in their current positions and the method 1000 returns to step 1006 to get the next event. If the user has selected the repositioning option, the method 1000 queries (at step 1030) whether any of the open windows have been moved from their original positions. If none of the open windows have been moved from their original positions, the method 1000 returns to step 1006 to get another event. If any of the windows have been moved from their original positions, the windows are returned to their original positions at step 1032. The method 1000 then returns to step 1006.

Figure 11:
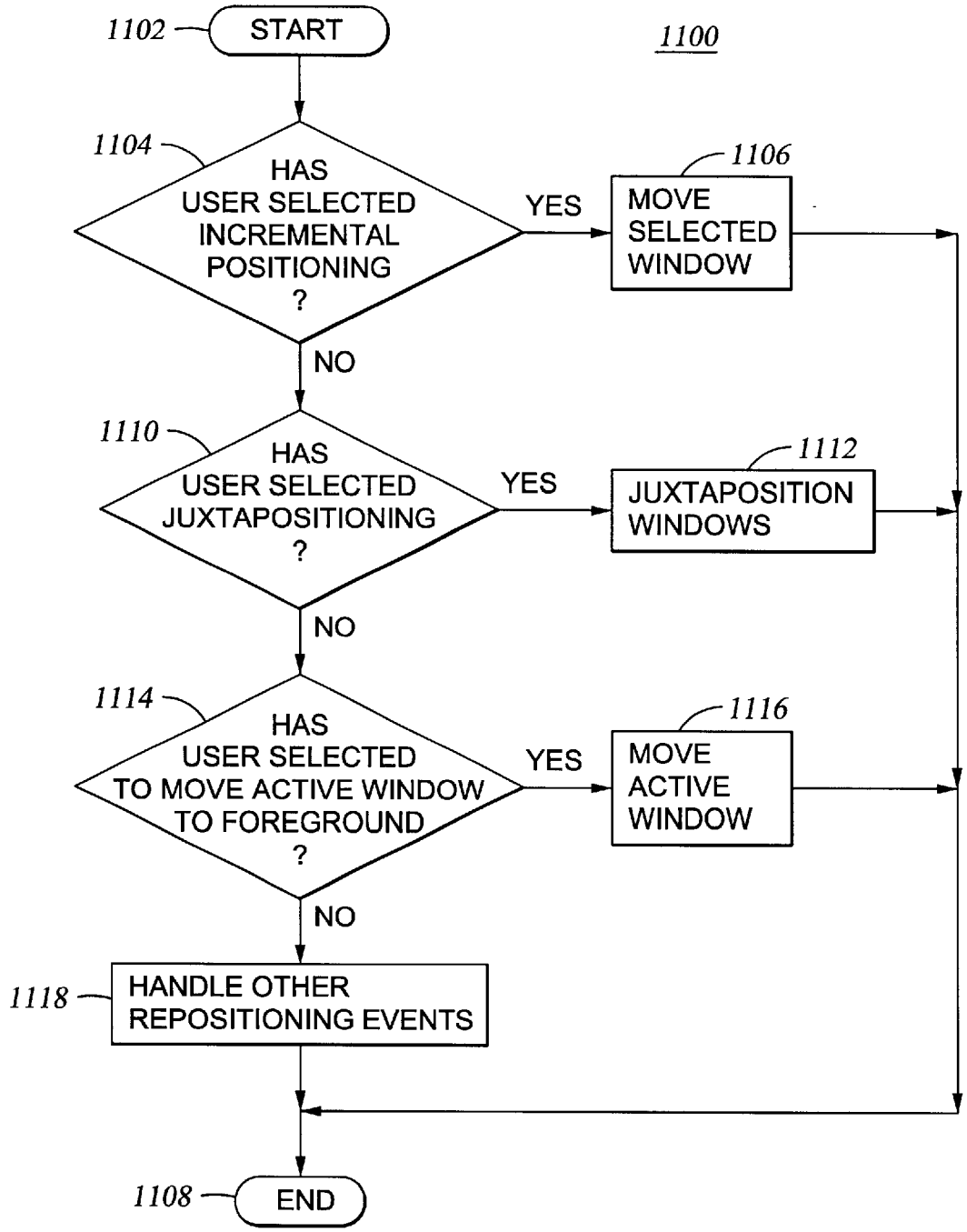
FIG. 11 is a flow diagram of a method for dynamically repositioning windows in a display area.

FIG. 11 shows a method 1100 illustrating one embodiment of step 1022. Specifically, FIG. 11 illustrates repositioning events according to the user selected parameters provided by GUI 200. Similar processing may be provided to handle repositioning at steps 1020 and 1027.

The method 1100 is entered at step 1102. At step 1104, the method 1100 queries whether the user has selected incremental positioning. That is, a determination is made as to whether checkbox 204 and one of checkboxes 204A and 204B was selected. If so, the user-selected window (determined by which of the checkboxes 204A and 204B is selected) is moved an incremental distance relative to the non-selected window. The incremental distance may be some default number of characters or, in some embodiments, may be a user selectable distance. The method 1100 then exits at step 1108 and returns to step 1006.

If step. 1104 is answered negatively, the method 1100 queries whether the user has selected to juxtaposition the windows. That is, a determination is made as to whether checkbox 206 is selected. If so, the windows are juxtaposed (as illustrated with reference to FIG. 4) and the method 1100 exits at step 1108.

If step 1110 is answered negatively, the method 1100 proceeds to step 1114 and queries whether the user has selected to move the active window to the foreground. That is, a determination is made as to whether checkbox 208 is selected. If so, the active window is moved to the foreground at step 1116 as was illustrated in FIG. 5. The method 1100 then exits at step 1108.

If step 1114 is answered negatively, the method 1100 proceeds to step 1118 where other repositioning events contemplated by the invention are handled. The method 1100 then exits at step 1108.

The foregoing methods are merely illustrative. Other embodiments are contemplated by the invention and will readily be identified by those skilled in the art.

While the foregoing is directed to the preferred embodiment of the present invention, other and further embodiments of the invention may be devised without departing from the basic scope thereof, and the scope thereof is determined by the claims that follow.

What is claimed is:

1. A method for controlling a position of an active window within a viewable screen area of an output device according to a relative position of a user activity site, wherein the user activity site is a visible screen element actively being influenced by a user via an input device to perform one of screen content input and screen content modification, comprising:

determining a condition indicating that a the user activity site in the active window is moving into an obstructed position in response to user input via the input device; and if the condition exists, reformatting a screen arrangement so that the user activity site remains in the viewable screen area and the user activity site is prevented from moving into the obstructed position.

2. The method of claim 1, wherein the user activity site comprises a cursor and the step of determining the condition comprises at least one of:

determining whether a distance between the cursor and an edge of an inactive window is a threshold number of characters; and determining whether a distance between the cursor and a boundary of the viewable screen area is the threshold number of characters.

3. The method of claim 1, wherein the step of determining the condition comprises determining whether the user activity site will become hidden from a view of a user of the output device.

4. The method of claim 1, wherein the step of determining the condition comprises: determining whether the user activity site will move into a region behind an inactive window.

5. The method of claim 1, wherein the step of determining the condition comprises: determining whether the user activity site will move to a region outside of the viewable screen area.

6. The method of claim 1, wherein the step of determining the condition comprises determining whether the user activity site will move to a region outside of the viewable screen area; and wherein the step of reformatting the screen arrangement comprises repositioning the active window to be wholly contained within the viewable screen area.

7. The method of claim 1, further comprising, prior to determining the condition, determining whether the user activity site is behind an overlapping portion of an inactive window:

if not, performing the step of determining the condition; and if so, performing only the step of reformatting.

8. The method of claim 1, further comprising, prior to determining the condition, determining whether the user activity site is in a region outside of the viewable screen area:

if not, performing the step of determining the condition; and if so, performing only the step of reformatting.

9. The method of claim 1, wherein reformatting comprises at least one of:

incrementally moving at least one of the active window and an inactive window;

moving at least one of the active window and the inactive window to eliminate an overlapping portion of the windows; and moving the active window to a foreground position relative to the inactive window.

10. The method of claim 1, further comprising an inactive window contained at least partially within the viewable screen area and forming an overlapping portion over the active window; and wherein the step of determining the condition comprises:

determining whether a distance between the user activity site and the overlapping portion of the inactive window is less than a threshold distance; and wherein the step of reformatting the screen arrangement comprises repositioning one of the active window and an inactive window.

11. A signal bearing medium containing a program which, when executed by one or more processors, performs a method for controlling a relative position of an active window within a viewable screen area of an output device according to a relative position of a user activity site, wherein the user activity site is a visible screen element actively being influenced by a user via an input device to perform one of screen content input and screen content modification, the method comprising:

determining a condition indicating that the user activity site in the active window is moving into an obstructed position in response to user input via the input device; and if the condition exists, reformatting a screen arrangement so that the user activity site remains in the viewable screen area and the user activity site is prevented from moving into the obstructed position.

12. The signal bearing medium of claim 11, wherein the user activity site comprises a cursor and the step of determining the condition comprises at least one of:

determining whether a distance between the cursor and an edge of an inactive window is a threshold number of characters; and determining whether a distance between the cursor and a boundary of the viewable screen area is the threshold number of characters.

13. The signal bearing medium of claim 11, wherein the step of determining the condition comprises: determining whether the user activity site will move into a region behind an inactive window.

14. The signal bearing medium of claim 11, wherein the step of determining the condition comprises: determining whether the user activity site will move to a region outside of the viewable screen area.

15. The signal bearing medium of claim 11, wherein the step of determining the condition comprises determining whether the user activity site will move to a region outside of the viewable screen area; and wherein the step of reformatting the screen arrangement comprises repositioning the active window to be wholly contained within the viewable screen area.

16. The signal bearing medium of claim 11, further comprising, prior to determining the condition, determining whether the user activity site is behind an overlapping portion of an inactive window:

if not, performing the step of determining the condition; and if so, performing only the step of reformatting.

17. The signal bearing medium of claim 11, further comprising, prior to determining the condition, determining whether the user activity site is in a region outside of the viewable screen area:

if not, performing the step of determining the condition; and if so, performing only the step of reformatting.

18. The signal bearing medium of claim 11, wherein reformatting comprises at least one of:

incrementally moving at least one of the active window and an inactive window in response to incremental user input;

moving at least one of the active window and the inactive window to eliminate an overlapping portion of the windows; and moving the active window to a foreground position relative to the inactive window.

19. The signal bearing medium of claim 11, further comprising an inactive window contained at least partially within the viewable screen area and forming an overlapping portion over the active window; and wherein the step of determining the condition comprises:

determining whether a distance between the user activity site and the overlapping portion of the inactive window is less than a threshold distance; and wherein the step of reformatting the screen arrangement comprises:

repositioning one of the active window and an inactive window.

20. A computer system comprising a display device, an input device, a memory and one or more processors configured to execute one or more programs supporting a windows environment comprising an active window within a viewable screen area of the display device; wherein when executed, the programs perform an operation of controlling a relative position of the active window according to a relative position of a user activity site, wherein the user activity site is a visible screen element actively being influenced by a user via the input device to perform one of screen content input and screen content modification, the operation comprising:

determining a condition indicating that a user activity site in the active window is moving into an obstructed position, wherein the user activity site is a graphical element actively being influenced by a user via the input device to perform one of screen content input and screen content modification; and if the condition exists, reformatting a screen arrangement so that the user activity site is contained in the viewable screen area, whereby the user activity site is prevented from moving into the obstructed position.

21. The computer system of claim 20, wherein the step of determining the condition comprises: determining whether the user activity site will move into a region behind an inactive window.

22. The computer system of claim 20, wherein the user activity site comprises a cursor and the step of determining the condition comprises at least one of:

determining whether a distance between the cursor and an edge of an inactive window is a threshold number of characters; and determining whether a distance between the cursor and a boundary of the viewable screen area is the threshold number of characters.

23. The computer system of claim 20, wherein the step of determining the condition comprises: determining whether the user activity site will move to a region outside of the viewable screen area.

24. The computer system of claim 20, wherein the step of determining the condition comprises determining whether the user activity site will move to a region outside of the viewable screen area; and wherein the step of reformatting the screen arrangement comprises repositioning the active window to be wholly contained within the viewable screen area.

25. The computer system of claim 20, further comprising, prior to determining the condition, determining whether the user activity site is behind an overlapping portion of an inactive window:

if not, performing the step of determining the condition; and if so, performing only the step of reformatting.

26. The computer system of claim 20, further comprising, prior to determining the condition, determining whether the user activity site is in a region outside of the viewable screen area:

if not, performing the step of determining the condition; and if so, performing only the step of reformatting.

27. The computer system of claim 20, wherein reformatting comprises at least one of:

incrementally moving at least one of the active window and an inactive window in response to incremental user input;

moving at least one of the active window and the inactive window to eliminate an overlapping portion of the windows; and moving the active window to a foreground position relative to the inactive window.

28. The computer system of claim 20, further comprising an inactive window contained at least partially within the viewable screen area and forming an overlapping portion over the active window; and wherein the step of determining the condition comprises:

determining whether a distance between the user activity site and the overlapping portion of the inactive window is less than a threshold distance; and wherein the step of reformatting the screen arrangement comprises:

repositioning one of the active window and an inactive window.

29. A method for controlling a position of an active window within a viewable screen area of an output device, comprising:

determining whether a user activity site contained within the active window is in a view-obstructing area of the output device, wherein the user activity site is a cursor;

if so, repositioning the active window so that the user activity site is contained within the viewable screen area;

after repositioning the active window, determining a condition indicating that the user activity site in the active window will move into the view-obstructing area; and if the condition exists, reformatting a screen arrangement so that the user activity site is contained in the viewable screen area.

30. The method of claim 29, wherein the step of determining the condition comprises at least one of:

determining whether the user activity site will move into a region behind an inactive window; and determining whether the user activity site will move to a region outside of the viewable screen area.

31. The method of claim 29, wherein the step of determining the condition comprises determining whether the user activity site will move to a region outside of the viewable screen area; and wherein the step of reformatting the screen arrangement comprises repositioning the active window to be wholly contained within the viewable screen area.

32. The method of claim 29, wherein the step of determining the condition comprises determining a distance between the cursor and at least one of an edge of an inactive window and a boundary of the viewable screen area.

33. A signal bearing medium containing a program which, when executed by one or more processors, performs a method for controlling a position of an active window within a viewable screen area of an output device, the method comprising:

determining whether a user activity site contained within the active window is in a view-obstructing area of the output device, wherein the user activity site is a cursor;

if so, repositioning the active window so that the user activity site is contained within the viewable screen area;

after repositioning the active window, determining a condition indicating that the user activity site in the active window will move into the view-obstructing area; and if the condition exists, reformatting a screen arrangement so that the user activity site is contained in the viewable screen area.

34. The signal bearing medium of claim 33, wherein the step of determining the condition comprises at least one of:

determining whether the user activity site will move into a region behind an inactive window; and determining whether the user activity site will move to a region outside of the viewable screen area.

35. The signal bearing medium of claim 33, wherein the step of determining the condition comprises determining whether the user activity site will move to a region outside of the viewable screen area; and wherein the step of reformatting the screen arrangement comprises repositioning the active window to be wholly contained within the viewable screen area.

36. The signal bearing medium of claim 33, wherein the step of determining the condition comprises determining a distance between the cursor and at least one of an edge of an inactive window and a boundary of the viewable screen area.

37. A computer system comprising a display device, an input device, a memory and one or more processors configured to execute one or more programs supporting a windows environment comprising an active window within a viewable screen area of the display device; wherein when executed, the programs perform an operation for controlling a position of the active window, comprising:

determining whether a user activity site contained within the active window is in a view-obstructing area of the output device; wherein the user activity site is a cursor;

if so, repositioning the active window so that the user activity site is contained within the viewable screen area;

after repositioning the active window, determining a condition indicating that the user activity site in the active window will move into the view-obstructing area; and if the condition exists, reformatting a screen arrangement so that the user activity site is contained in the viewable screen area.

38. The computer system of claim 37, wherein the step of determining the condition comprises: determining whether the user activity site will move into a region behind an inactive window.

39. The computer system of claim 37, wherein the step of determining the condition comprises: determining whether the user activity site will move to a region outside of the viewable screen area.

40. The computer system of claim 37, wherein the step of determining the condition comprises determining whether the user activity site will move to a region outside of the viewable screen area; and wherein the step of reformatting the screen arrangement comprises repositioning the active window to be wholly contained within the viewable screen area.

41. The computer system of claim 37, wherein the step of determining the condition comprises determining a distance between the cursor and at least one of an edge of an inactive window and a boundary of the viewable screen area.

* * * * *